United States Patent
Qin

(10) Patent No.: US 9,256,665 B2
(45) Date of Patent: Feb. 9, 2016

(54) CREATION OF INVERTED INDEX SYSTEM, AND DATA PROCESSING METHOD AND APPARATUS

(71) Applicant: Alibaba Group Holding Limited, Grand Cayman (KY)

(72) Inventor: Jian Qin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 211 days.

(21) Appl. No.: 14/045,613

(22) Filed: Oct. 3, 2013

(65) Prior Publication Data

US 2014/0101167 A1    Apr. 10, 2014

(30) Foreign Application Priority Data

Oct. 9, 2012  (CN) .......................... 2012 1 0380761

(51) Int. Cl.
*G06F 17/30* (2006.01)
(52) U.S. Cl.
CPC .... *G06F 17/30622* (2013.01); *G06F 17/30619* (2013.01)
(58) Field of Classification Search
None
See application file for complete search history.

(56) References Cited

U.S. PATENT DOCUMENTS

| | | | |
|---|---|---|---|
| 7,558,802 B2 | 7/2009 | Yako et al. | |
| 7,590,645 B2 | 9/2009 | Nayak | |
| 7,634,468 B2 | 12/2009 | Stephan | |
| 7,664,928 B1* | 2/2010 | Andrews et al. | 712/14 |
| 7,716,211 B2 | 5/2010 | Peltonen et al. | |
| 7,765,215 B2 | 7/2010 | Hsu et al. | |
| 7,899,796 B1* | 3/2011 | Borthwick et al. | 707/692 |
| 8,171,029 B2 | 5/2012 | Marvit et al. | |
| 8,266,137 B2 | 9/2012 | Lei et al. | |
| 8,271,499 B2 | 9/2012 | Hadjieleftheriou et al. | |
| 2004/0205044 A1 | 10/2004 | Su et al. | |
| 2006/0149973 A1* | 7/2006 | Koseki et al. | 713/193 |
| 2007/0124277 A1* | 5/2007 | Chen et al. | 707/2 |
| 2008/0133565 A1 | 6/2008 | Yasuda et al. | |
| 2009/0055370 A1 | 2/2009 | Dagum et al. | |
| 2009/0228528 A1 | 9/2009 | Ercegovac et al. | |
| 2010/0082774 A1 | 4/2010 | Pitts | |
| 2010/0211572 A1* | 8/2010 | Beyer et al. | 707/742 |

OTHER PUBLICATIONS

Cizina, et al., "SQL Reference Guide—Cross Joins and Views", retrieved on Dec. 17, 2013 at <<http://www.oninit.com/manual/informix/english/docs/60rbrick/6364.pdf>>, Informix Corporation, Nov. 1, 1999, pp. 7-12, pp. 7-13, pp. 8-157, pp. 8-165.

Hardt, et al., "Suchmaschinen entwickeln mit Apache Lucene", Software and Support Verlag, Jan. 21, 2004, pp. 83-87.

(Continued)

*Primary Examiner* — Wilson Lee
(74) *Attorney, Agent, or Firm* — Lee & Hayes, PLLC

(57) ABSTRACT

The present disclosure relate to techniques for establishing an inverted indexing system and related data processing. The techniques may include writing, by a computing device, inverted indexes of a massive amount of data records into at least one inverted file. The computing device may then write description information of the written inverted file into a description file associated with the inverted file, and establish the inverted indexing system based on the inverted file and the description file of the inverted file. The techniques enhance efficiency in establishing the inverted indexing system and in processing data using the systems.

17 Claims, 9 Drawing Sheets

(56) References Cited

OTHER PUBLICATIONS

Lee, et al., "Index Structures for Structured Documents", Proceedings of the ACM International Conference on Digitallibraries, Mar. 20, 1996, pp. 91-99.

Luk, et al., "A Survey in Indexing and Searching XML Documents", Journal of the American Society for Information Science and Technology, vol. 53, No. 6, Jan. 1, 2002, pp. 415-437.

PCT Search Report and Written Opinion mailed Jan. 29, 2014 for PCT Application # PCT/US13/63291, 13 pages.

* cited by examiner

CREATION OF INVERTED INDEX SYSTEM, AND DATA PROCESSING METHOD AND APPARATUS

CROSS REFERENCE TO RELATED PATENT APPLICATIONS

This application claims priority to Chinese Patent Application No. 201210380761.5, filed on Oct. 9, 2012, entitled "Creation of Inverted Index System Based on Lucene, and Data Processing Method and Apparatus," which is hereby incorporated by reference in its entirety.

TECHNICAL FIELD

The present disclosure relates to the field of information indexing technology, and more particular to establishing an inverted indexing system and to data processing using the inverted indexing system.

BACKGROUND

A traditional searching method searches a record attribution by using identifiers of data records. Unlike the traditional searching method, an improved system performs searches using specific attributions of data records. A file written with inverted indexing is usually called an inverted file. Therefore, the improved system, such as Lucene system, highly improves the efficiency of data searching. However, the conventional method for the improved system to build its inverted indexing system is inefficient. Especially when encountering a large amount of data, the improved system needs to spend more time for establishing the inverted indexing system. The conventional method for establishing the improved system's inverted indexing system is as follows. Initially, inverted indexes of the data records are written into an inverted file; and the process is directed to return to the file header of the inverted file for fulfilling description information, such as a size of the inverted file. Since the inverted file of the improved system must be "written in sequence," the inverted file should be previously stored in a local storage device itself to form an inverted file containing description information. And, after the file header is fulfilled, multiple inverted files are sequentially uploaded to the improved system to establish the inverted indexing system.

Thus, the conventional method for establishing the inverted indexing system requires a use of an external storage device and multiple times of I/O disk access. This requires additional processes and therefore causes a low efficiency for establishing the system and a low speed for processing data.

SUMMARY

To solve technical problems discussed above, the present disclosure provides a method for establishing an inverted indexing system, a method for data processing using an inverted indexing system, and a system for establishing the inverted indexing system and processing data using the inverted indexing system.

The present disclosure provides a method for establishing an inverted indexing system. The method includes writing, by a computing device, inverted indexes of a massive amount of data records to at least one inverted file. The computing device may write description information of the written inverted file into a description file associated with the inverted file after finishing the writing to the inverted file. The computing device may then establish an inverted indexing system based on the inverted file and the description file of the inverted file.

In some embodiments, the computing device may partition the massive amount of data records into multiple data segments, and write inverted indexes for data records in each data segment into at least one inverted file. In these instances, the computing device may select one attribute of the data records as a function argument, and retrieving a function value based on a predetermined functional mapping relation, and then may combine the inverted file and the description file of the inverted file belonging to the data records that have the same function value into one indexing segment partition. The computing device may also establish the inverted indexing system based on a multiple indexing segment partitions.

The present disclosure further provides a method for data processing using an inverted indexing system. The computing device may receive a searching keyword and a data processing request from a user's input. Then, the computing device may search the massive amount of data records based on the searching keyword using the inverted indexing system. In some instances, the inverted indexing system is established using the method discussed above.

In some embodiments, the computing device may perform a data processing, corresponding to the data processing request, in connection with a searching result based on a value in the inverted indexing system for the searching keyword.

In some embodiments, the computing device may sort the searching result based on the value in the inverted indexing system for the searching keyword, and perform a data statistics based on the sorted searching result.

In some embodiments, when the data processing request is for cross grouping of the searching result, the computing device may perform a cross-combining operation based on the value in the inverted indexing system for the searching keyword to form a constraint condition of cross-grouping searching, and perform a cross-grouping operation in connection with the searching result based on the constraint condition of searching.

In some embodiments, when the data processing request is for de-duplication and summation of the searching result, the computing device may look up a record number that corresponds to the value in the inverted indexing system for the searching keyword, and retrieve a data object based on the record number. Then, the computing device may perform a summing up operation in connection with the retrieved data object.

The present disclosure further provides a system for establishing an inverted indexing system. The system may include a first writing unit, a second writing unit, and an establishing unit. The first writing unit may be configured to write inverted indexes of a massive amount of data records into at least one inverted file. The second writing unit may be configured to write description information of the written inverted file to a description file associated with the inverted file after finishing the writing to the inverted file. The establishing unit may be configured to establish an inverted indexing system based on the inverted file and the description file of the inverted file.

In some embodiments, the first writing unit may include a partitioning sub-unit and a writing sub-unit. The partitioning sub-unit may be configured to partition the massive amount of data records into multiple data segments. The writing sub-unit may be configured to write inverted indexes for data records in each data segment into at least one inverted file.

In some embodiments, the establishing unit may include a retrieving sub-unit, a combining sub-unit, and an establishing sub-unit. The retrieving sub-unit may be configured to select one attribution of the data records as a function argument, and to retrieve a function value based on a predetermined functional mapping relation. The combining sub-unit may be configured to combine the inverted file and the description file of the inverted file into one indexing segment partition. The description file of the inverted file belongs to the data records that have the same function value. The establishing sub-unit may be configured to establish the inverted indexing system based on the multiple indexing segment partitions.

The present disclosure further provides a system for processing data in inverted indexing system. The system may include a receiving unit, a searching unit, and a processing unit. The receiving unit may be configured to receive a searching keyword and a data processing request from a user's input. The searching unit may be configured to search the massive amount of data records based on the searching keyword using the inverted indexing system. The inverted indexing system may be established by the method for establishing the inverted indexing system, as discussed above.

The processing unit may be configured to perform a data processing corresponding to the data processing request in connection with a searching result based on a value in the inverted indexing system for the searching keyword.

In some embodiments, when the data processing request received by the receiving unit is for retrieving statistics of the searching result, the processing unit may include a sorting sub-unit and a statistics performing sub-unit. In these instances, the sorting sub-unit may be configured to sort the searching result based on the value in the inverted indexing system for the searching keyword. The statistics performing sub-unit may be configured to perform a data statistics based on the sorted searching result.

In some embodiments, when the data processing request is for cross grouping of the searching result, the processing unit may include a constraint condition forming sub-unit and a cross-grouping sub-unit. The constraint condition forming sub-unit may be configured to perform a cross-combining operation based on the value in the inverted indexing system for the searching keyword to form a constraint condition of cross-grouping searching. The cross-grouping sub-unit may be configured to perform a cross-grouping operation in connection with the searching result based on the constraint condition of searching.

In some embodiments, when the data processing request is for de-duplication and summation of the searching result, the processing unit may include a record number looking up sub-unit and a data object summation sub-unit. The record number looking up sub-unit may be configured to look up a record number that corresponds to the value in the inverted indexing system for the searching keyword. The data object summation sub-unit may be configured to retrieve a data object based on the record number and to perform a summing up operation in connection with the retrieved data object.

In the embodiments of the present disclosure, the description information of the inverted file is written to the inverted file after inverted indexes of a large amount of data records are written into the inverted file. Then, the inverted indexing system may be established based on the inverted file and the description file of the inverted file. As compared with the conventional art, embodiments of the present disclosure separates the inverted file and the description file of the inverted file as two or more independent files, and therefore prevents a modification operation of the file header after the writing of the inverted indexes file is finished. The embodiments use the feature of "writing in sequence" to enhance the efficiency in establishing the inverted indexing system without the necessity of using an external storage device for processing the writing for a whole inverted file. In addition, the inverted indexing system based on the embodiments of the present disclosure achieves fast data processing even when dealing with a large amount of data records.

This Summary is not intended to identify all key features or essential features of the claimed subject matter, nor is it intended to be used alone as an aid in determining the scope of the claimed subject matter.

BRIEF DESCRIPTION OF THE DRAWINGS

The Detailed Description is described with reference to the accompanying figures. The use of the same reference numbers in different figures indicates similar or identical items.

DETAILED DESCRIPTION

To enable a person skilled in the art to better understand the technical solutions of the present disclosure, the technical solutions of the present disclosure will be clearly and comprehensively described below with reference to the accompanying drawings of the embodiments of the present disclosure. It is obvious that the embodiments to be described are only a part rather than all of the embodiments of the present disclosure. All other embodiments obtained by persons with ordinary skill in the art based on the embodiments of the present disclosure without creative effects shall be regarded as falling within the protection scope of the present disclosure.

As mentioned above, the inverted indexing operation is processed by applying an attribution value of data operating objects as a keyword to retrieve a record in relation to the keyword. The method of the inverted indexing operation is faster than a conventional method whose targeting record is retrieved by a scanning of line-by-line and page-by-page. However, before processing the searching in relation to the data operating objects, a computing device needs to establish an inverted indexing system for the data. In general, the larger the amount of data is, the longer time for establishing the inverted indexing system requires. Therefore, the time spent in this process is too long to be tolerable because the amount of data rapidly expands to a massive level (e.g., data including 100 hundred million lines with over hundreds or thousands columns). The Lucene, as a leader in this technical field, becomes inefficient for establishing the inverted indexing system for a large amount of data. Embodiments of the present disclosure provide an improved solution with respect to the drawbacks of conventional methods for establishing inverted indexing system.

Figure 1:
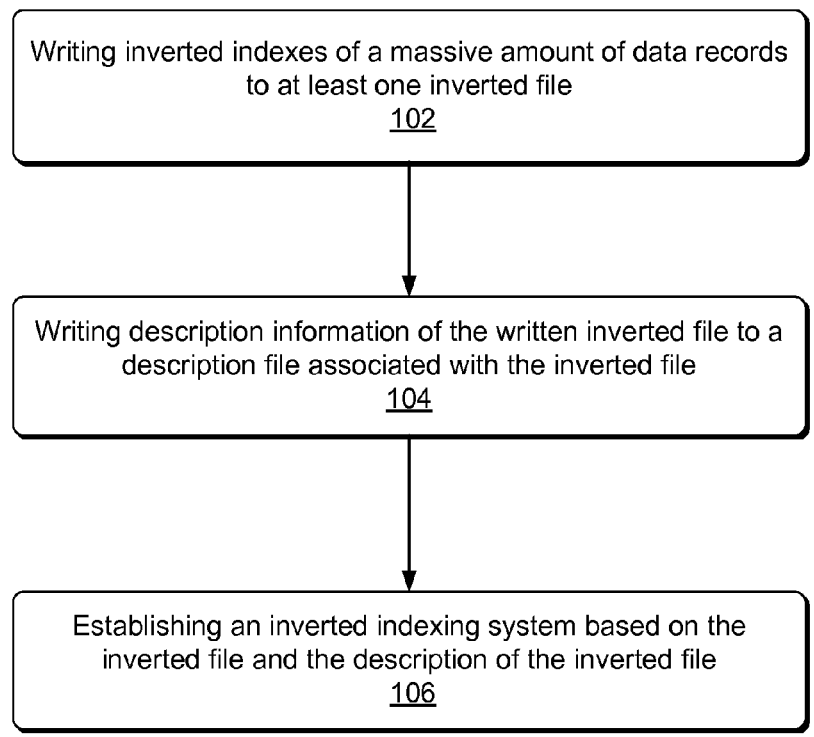
FIG. 1 is a flow chart illustrating a method for establishing an inverted indexing system.

FIG. 1 shows a flow chart of a method for establishing an inverted indexing system (e.g., a Lucene-based inverted indexing system). The method of the embodiments may include writing, by a computing device, inverted indexes of a massive amount of data records into at least one inverted file at 102.

The inverted file may be a file for storing the inverted indexes of massive amount of data records, and be set to any size based on the necessity. The size of the inverted file may be predetermined (e.g., about 64 KB). Too large size may cause many user data being placed in a single inverted file. Too small size may cause an enormous amount of the inverted files. In the case that the amount of data is significantly large, there will be a number of inverted files written with inverted indexes. In some embodiments, there is no limitation for the data form of the data record. The data may be in a form of a table, such as a business statistics table in relation to a large amount of user data and product data. In some instances, the data may be in a form of text, such as a large amount of WebPages. In some instances, for certain types of data, some preprocessing steps (e.g., such as de-noising, formatting, filtering and etc.) may be performed to facilitate establishing and writing of the inverted index.

At 104, the computing device may write description information of the written inverted file into a description file associated with the inverted file. In some embodiments, after the writing of the inverted indexes is finished, the description information associated with the inverted file may be stored into a single new file. In these instances, the description information may be information with respect to a size of an inverted file, a number of the stored inverted indexes, a start address of file or an end address of file, and etc.

In some embodiments, the description information may be written immediately after the writing of one inverted file is finished or after the writing of all inverted files is finished. It is also noted that the specific corresponding relationship between the inverted file and the description file is not limited in the embodiments. One inverted file may correspond to one description file, or multiple inverted files may correspond to one description file. In some embodiments, multiple inverted files may correspond to only one description file.

At 106, the computing device may establish an inverted indexing system based on the inverted file and the description file of the inverted file.

After the inverted file and the description file of the inverted file are formed based on the above steps, the inverted indexing system may be established based on these files. The established inverted indexing system may be used for achieving the searching of the massive amount of data. The processes of establishing the inverted indexing system may be regarded as a process of organizing and managing the inverted file and the description file.

In some embodiments, the inverted indexes of the massive amount of data may be written to the inverted file, and the description information of the inverted file may be written to the description file. Then, the inverted indexing system may be established based on the inverted file and the description file of the inverted file. As compared with the conventional art, the embodiments of the present disclosure separates the inverted file and the description file of the inverted file as two or more independent files to prevent a use of external storage device in a process of modifying a file header after finishing the writing of the inverted indexing file. The embodiments of present disclosure use the Lucene's feature of "writing in sequence" and enhance the efficiency in establishing the Lucene-based inverted indexing system without the necessity of using an external storage device while in a process of Lucene's writing of a whole inverted file.

Figure 2A:
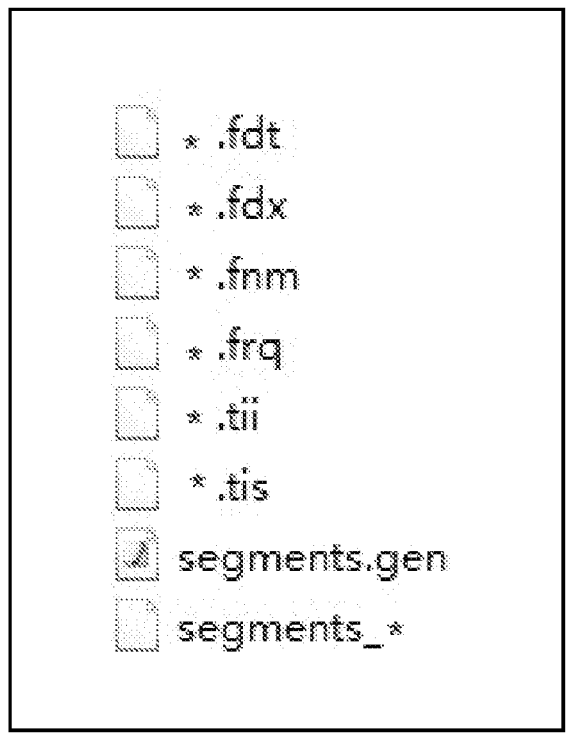
FIG. 2(a) is a diagram illustrating a file list stored in Lucene.
Figure 2B:
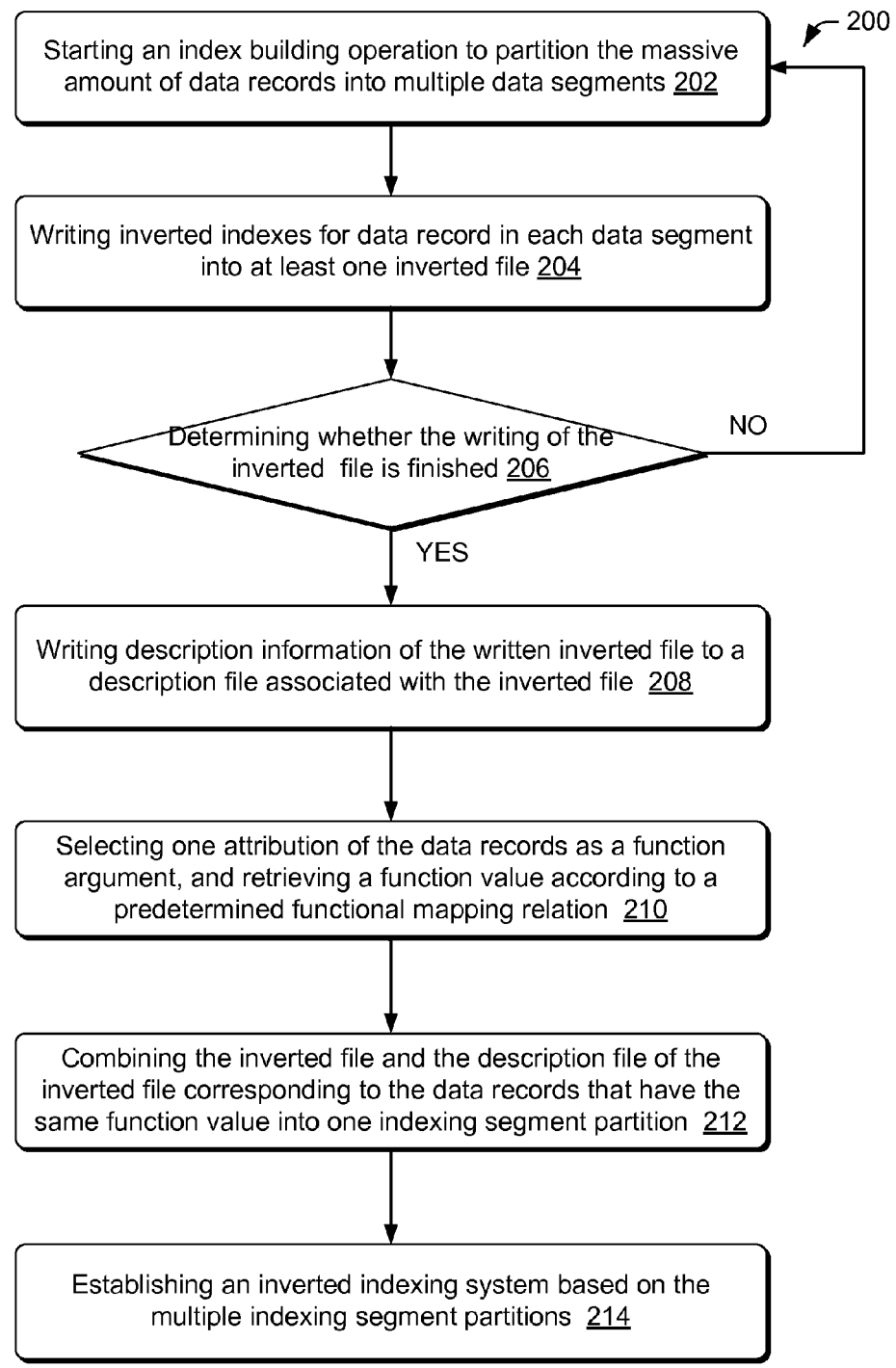
FIG. 2(b) is a flow chart illustrating a method for establishing an inverted indexing system.

FIG. 2(*a*) shows a file list stored in a low level storage structure of Lucene, and all these file lists form one complete inverted indexing system. In the list, a ".tis" file is an inverted file for storing the inverted indexes therein.

FIG. 2(*b*) shows a flow chart of a method for establishing an inverted indexing system. The method may include starting, by a computing device, an index establishing operation to partition the massive amount of data records into multiple data segments at 202.

After starting the establishing of the indexing system, the computing device may call multiple Lucene processes to partition the massive amount of data record (e.g., raw data) into multiple data segments based on the size of the storage space. The size of each data segment may be the same. For example, while the amount of data of the massive amount of data records is in Terabyte (TB) to Petabyte (PB) level, each data segment may be set to 1 Gigabyte (GB). The massive amount of data records in the embodiments is partitioned into a k number of data segments, and the data segments are located in the Hadoop Distributed File System (HDFS) system of Lucene.

At 204, the computing device may write inverted indexes for data record in each data segment into at least one inverted file. At 206, the computing device may determine whether the writing of the inverted file is finished. If the writing of the inverted file is finished (i.e., the branch of "YES"), the operation may advance to 208. If not (i.e., the branch of "NO"), the operation may advance to the operation 202.

At 208, the computing device may write description information of the written inverted file into to a description file associated with the inverted file. At 210, the computing device may select one attribution of the data records as a function argument, and retrieve a function value based on a predetermined functional mapping relation.

The data record has multiple attributions in addition to an identification number that uniquely identifies the data record. For example, while the data record is stored in the form of table such as a matrix, a line number of each line may be used as an identification number of the data record. In addition to the line number, each data record may also contain multiple rows, and each row refers to an attribution of the data records. When a function argument is to be selected, a value (i.e., attribution value) of any row as an input value of the function argument (e.g., such as a user ID, a product ID and the like) may also be selected. Here, there may be various predetermined mapping functions. For illustrative purpose, the embodiments take a remainder function as an example. When a remainder operation is processed in relation to a selected attribution value (e.g., a user ID) to obtain a finite number of remainder values (1, 2 . . . n), the computing device may partition each data segment into n groups. In these instances, "n" is the same as a number of indexing segment partitions in the subsequent steps. "n" may be also referred to as a "Key value" of the indexing segment partition.

At 212, the computing device may combine the inverted file and the description file of the inverted file corresponding to the data records that have the same function value into one indexing segment partition.

In some embodiments, the step of combining the inverted file and the description file of the inverted file corresponding to the data records that have the same function value into one indexing segment partition may include two sub-steps. In these instances, one is a combining process within one data segment, and the other is a combining process between/among the data segments. With regard to a combining process within one data segment, the data records in each data segment have been partitioned into n groups based on n remainder values (i.e., key value), and the inverted indexes and the description file of each data record have been established. Therefore, the inverted indexes and the description file thereof corresponding to the data records having the same remainder value may be combined. The retrieved inverted indexes file is referred to as a "small index". In this way, a data partition contains a number of n small indexes. For the massive amount of data records, the data partition may contain k×n small indexes in total. Regarding the combining process between/among the data segments, the number of the index files has been decreased by means of the above combining process within one data segment. In some embodiments, to further "compress" the indexing system, the computing device may recombine the "small indexes" that are located in different data segments and have the same reminder value (key value). In other words, the computing device may combine multiple small indexes having the same key value into one indexing segment partition, which is referred as a "large index". These "large indexes" may be then written in sequence to the HDFS file system of Lucene. In a system of Lucene, the above combining process within one data segment may be deemed as a mapping process; the process of combining indexes between/among the data segments may be referred to as a reducing process. In some embodiments, for the purpose of combining the "small indexes", the computing device may perform the combining process based on the key order after sorting the k×n small indexes in Hadoop by means of a Suffle process.

At 214, the computing device may establish the inverted indexing system based on the multiple indexing segment partitions.

The "large indexes" may be established based on the above steps, and the inverted indexing system is then established based on the larger indexes so that a process of searching for the massive amount of data may be performed based on the inverted indexing system.

In some embodiments, the low level storage structure of Lucene is modified such that the inverted file may be written in sequence to the HDFS without the necessity of being previously written to a local storage device. Therefore, the inverted file may also be uploaded to the HDFS, as the conventional art, while still being able to achieve the same or similar technical effects as the previous embodiments to enhance the efficiency in establishing the inverted indexing system. In addition, during establishing of the indexing system, the embodiments may apply a mapping operation and a reducing operation to optimize the process of establishing the indexing system and to reduce the cost of a disk. Thus, as compared with the conventional art, the present disclosure further enhances the efficiency in establishing the Lucene-based inverted indexing system. To quantify the differences of technical effects between the embodiments and the conventional art, an experiment in the systems having the same data processing capability with respect to the same data amount and the configuration were performed. The experiment shows that the conventional process of establishing of the inverted indexing system may be shortened from 12 hours to less than 1.5 hours. In other words, the efficiency increases 87.5%.

After the Lucene-based inverted indexing system is established based on the above embodiments, a series of data processing operations may be performed on the basis of the inverted indexing.

Figure 3:
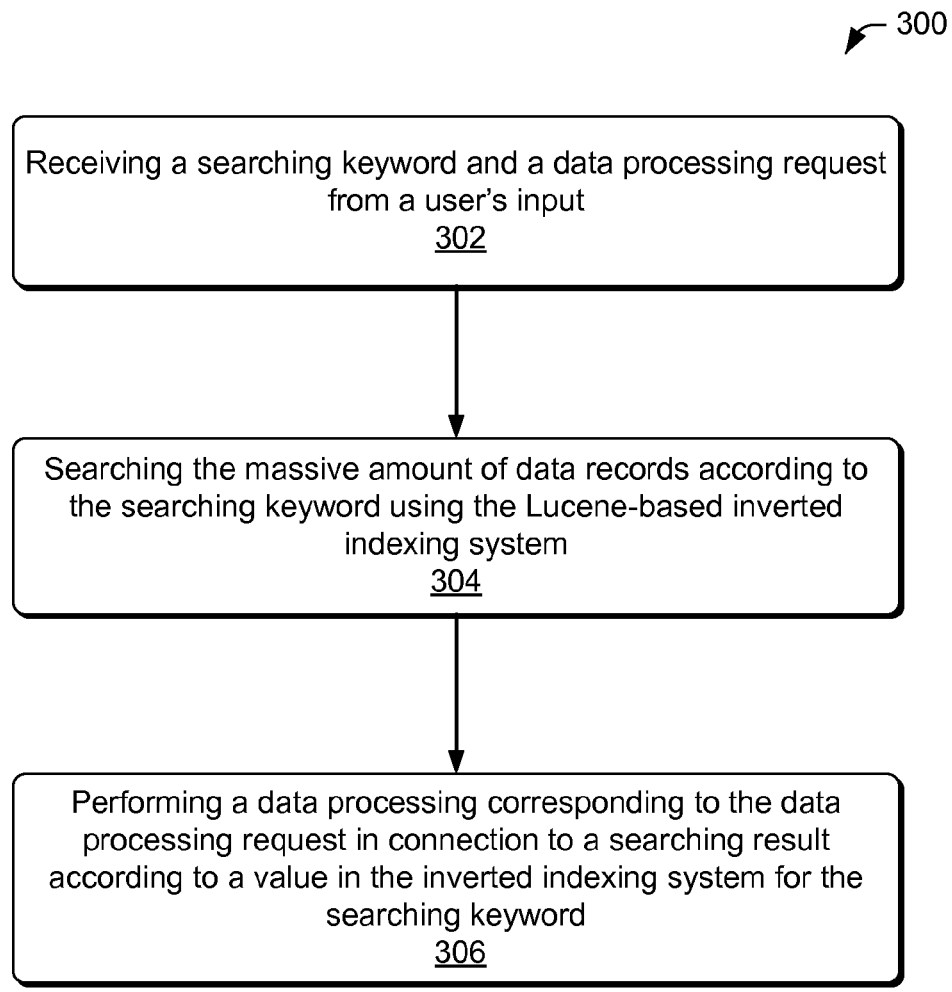
FIG. 3 is a flow chart illustrating a method for data processing using an inverted indexing system.

FIG. 3 shows a flow chat of the method. The method may include receiving, by a computing device, a searching keyword and a data processing request from a user's input at 302.

Depending on real demands of the work, a computing device needs to retrieve the desired data by searching the massive amount of the data for the desired data, and then perform a processing operation in relation to the data. For example, a website operator or a business intelligence analyst may search the massive amount of the data for information valuable by searching the client-related or product-related database to obtain and to analyze the related data, such as user consumption grouping and reasons for losing customers. The computing device must obtain searching keyword(s) to perform searches and receive the data processing request while it is necessary to perform necessary data processing. The data processing may include a statistics processing in relation to the searching results, an operation of cross grouping, a de-duplication process, and the like on the basis of the searching.

At 304, the computing device may search the massive amount of data records based on the searching keyword using the Lucene-based inverted indexing system, which is established by the above methods for establishing the Lucene-based inverted indexing system.

After the searching keyword(s) is/are received, the computing device may process the searching with respect to the massive amount of data records by using the inverted indexing system established in the above embodiments. Because the received "keyword(s)" here is/are the keyword(s) used in the process of establishing the inverted indexing system, the computing device may execute a looking up process and retrieve the record, by using the keyword, with the attribution related to the keyword to thus retrieve the desired data.

At 306, the computing device may perform a data processing corresponding to the data processing request in connection with a searching result based on a value in the inverted indexing system for the searching keyword.

In some embodiments, the computing device may, based on a Lucene inverted indexing system, perform the data processing in accordance with the keyword and the data processing request. Because a "specific" inverted indexing system is used in the process of data processing operation in some instances, the efficiency of the data processing operation is improved as compared with other data processing operations (e.g., a typical database grouping). For example, Oracle Real Application Clusters (Oracle RAC) does not support a quick searching with respect to the massive amount of the data, and is a typical Not Only Structured Query Language (NOSQL) grouping that applies a sequential scanning method, or the like. As shown in a quantitative test, these data processing operations in the typical database grouping and the typical NOSQL grouping usually take several minutes or even several hours. But in the present embodiments, after a user submits the data processing request, the result may be retrieved within a few seconds (1~10 s), 100 times faster than the above data processing operations. In addition, the embodiments may also have advantages of high concurrent loading and of low cost. These embodiments may use fewer servers than other data processing operations under a same condition (e.g., the same amount of data and data processing capability).

FIG. 4(*a*) shows a process of data processing when the data processing request is for retrieving statistics of the searching result. When the data processing request is for retrieving statistics of the searching result, the operation of performing the data processing in connection with the searching result based on the value in the inverted indexing system for the searching keyword may include: sorting, by a computing device, the searching result based on the value in the inverted indexing system for the searching keyword, and performing a data statistics based on the sorted searching result.

Figure 4A:
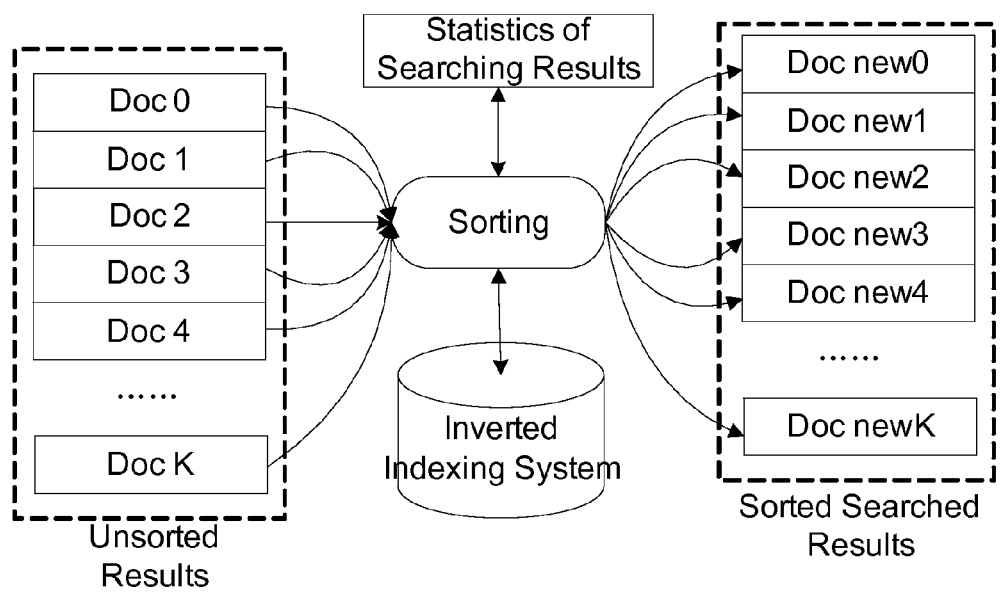
FIG. 4(a) is a schematic diagram illustrating data processing of a data processing request for retrieving statistics of the searching result.

As illustrated in FIG. 4(a), the searching result, which is unsorted, is shown in the left side. The middle portion shows a process that applies Lucene's sorting program in the Lucene-based inverted indexing system. The right side of FIG. 4(a) shows a collection of the sorted searching result. Since a value may be retrieved directly from the established inverted indexing system and the sorting operation is performed based on the value, the computing device may perform the sorting operation simultaneously with the querying operation to get faster in several orders of magnitude than methods that obtains statistics by means of sequential scanning. The more data objects are provided for the data statistics, the more advantageous the present embodiments are. One of the statistics operations in the embodiments may be an operation for at least one of obtaining a sum value, obtaining a maximum/minimum value, obtaining a counting value, obtaining an average value, and the like.

Figure 4B:
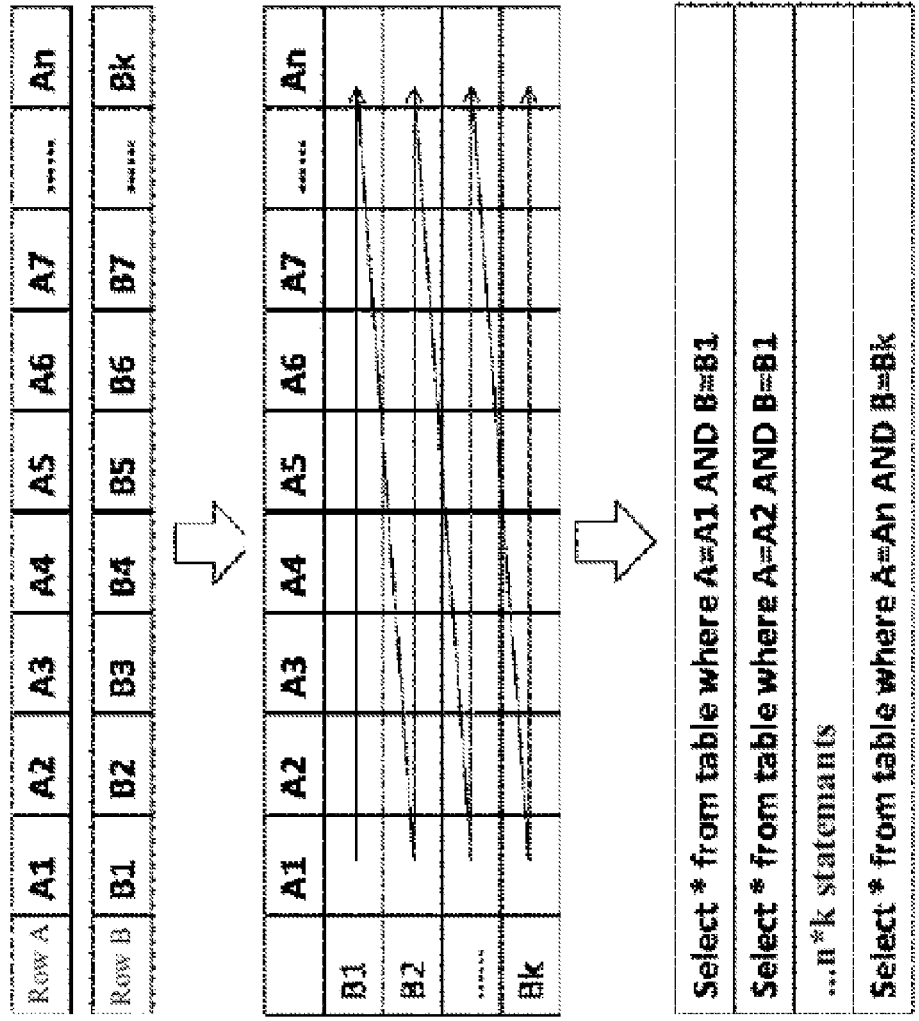
FIG. 4(b) is a schematic diagram illustrating data processing of a data processing request for cross-grouping.

FIG. 4(b) shows a process of data processing when the data processing request is for cross grouping of the searching result. When the data processing request is for cross grouping of the searching result, the operation of performing the data process in connection with the searching result based on the value in the inverted indexing system for the searching keyword may include: performing, by a computing device, a cross-combining operation based on the value in the inverted indexing system for the searching keyword to form a constraint condition for a new cross-grouping searching. Accordingly, the computing device may perform a cross-grouping operation in connection with the searching result based on the constraint condition. The upper side in FIG. 4(b) shows two rows of data (i.e., row A and row B) in the inverted indexing system whose specific values may be obtained by means of a facet method of Lucene. The middle of FIG. 4(b) shows a constraint condition table for the data of two rows. The lower side of FIG. 4(b) shows query statements obtained based on the table. In the cross grouping operation based on the embodiments, establishing of the constraint condition table may be faster so as to improve the efficiency of cross grouping because the data value in each row have been known in advance during the process of establishing the inverted indexing system.

Figure 4C:
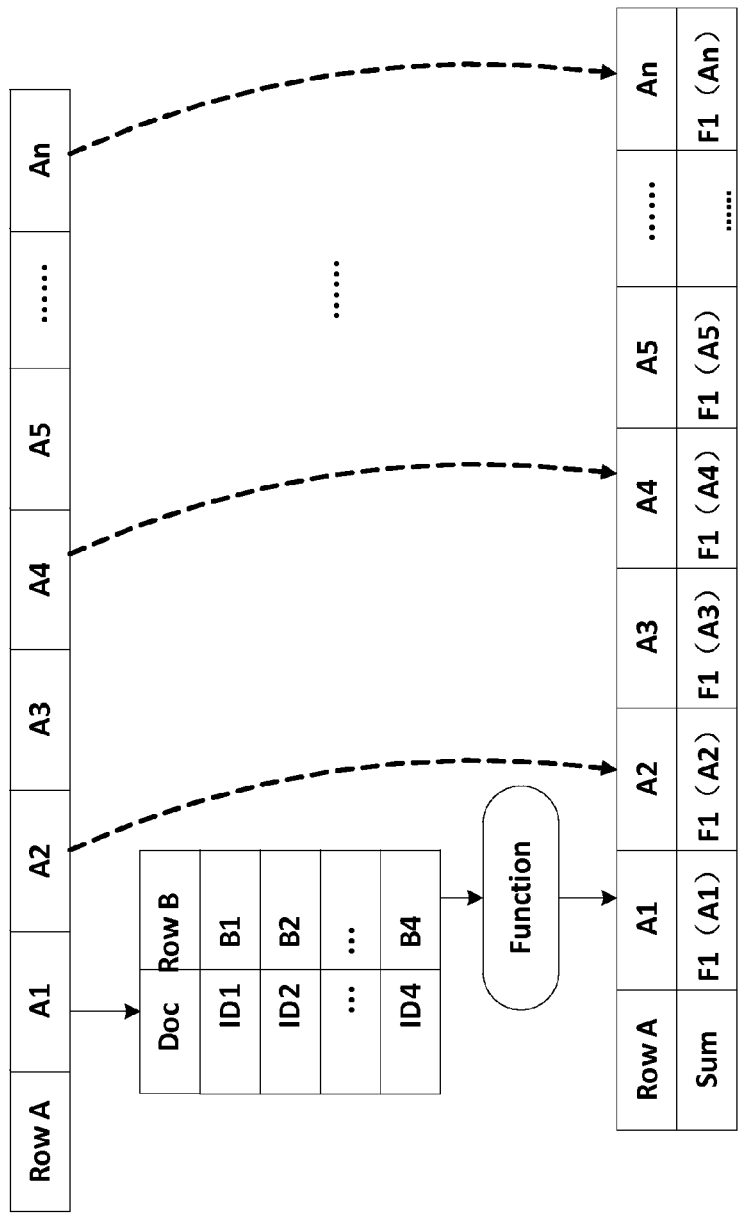
FIG. 4(c) is a schematic diagram illustrating data processing of a data processing request for de-duplication and summation of the searching result.

FIG. 4(c) shows a process of data processing when the data processing request is for de-duplication and summation of the searching result. When the data processing request is for de-duplication and summation of the searching result, the operation of performing the data processing in connection with the searching result based on the value in the inverted indexing system for the searching keyword may include: looking up a record number corresponding to the value in the inverted indexing system for the searching keyword, and obtaining data object to be summing up in another row based on the record number so that a summing up operation is performed in connection with the data objects to be process. The upper side of FIG. 4(c) shows that one row (i.e., row A) of the inverted indexing system has been previously grouped and de-duplicated in an establishing stage of the index. The specific values of the row may be obtained by means of the facet method of Lucene. The middle of FIG. 4(c) shows the data to be summed up of another row (i.e., row B) that is obtained based on the document ID. After the process of summing up as shown in the lower of FIG. 4(c), the returned result that is de-duplicating processed before summing up with another row is obtained. In the de-duplication and summation operation based on the embodiments, the searching results that is duplicated and is with a low duplication ratio may be quickly removed because the data value in each row are known in advance during the process of establishing the inverted indexing system. This improves the efficiency of summing.

In addition to descriptions of the method embodiments of the present disclosure as above, a system for establishing a Lucene-based inverted indexing system and a system for processing data in Lucene-based inverted indexing system are also provided.

Figure 5A:
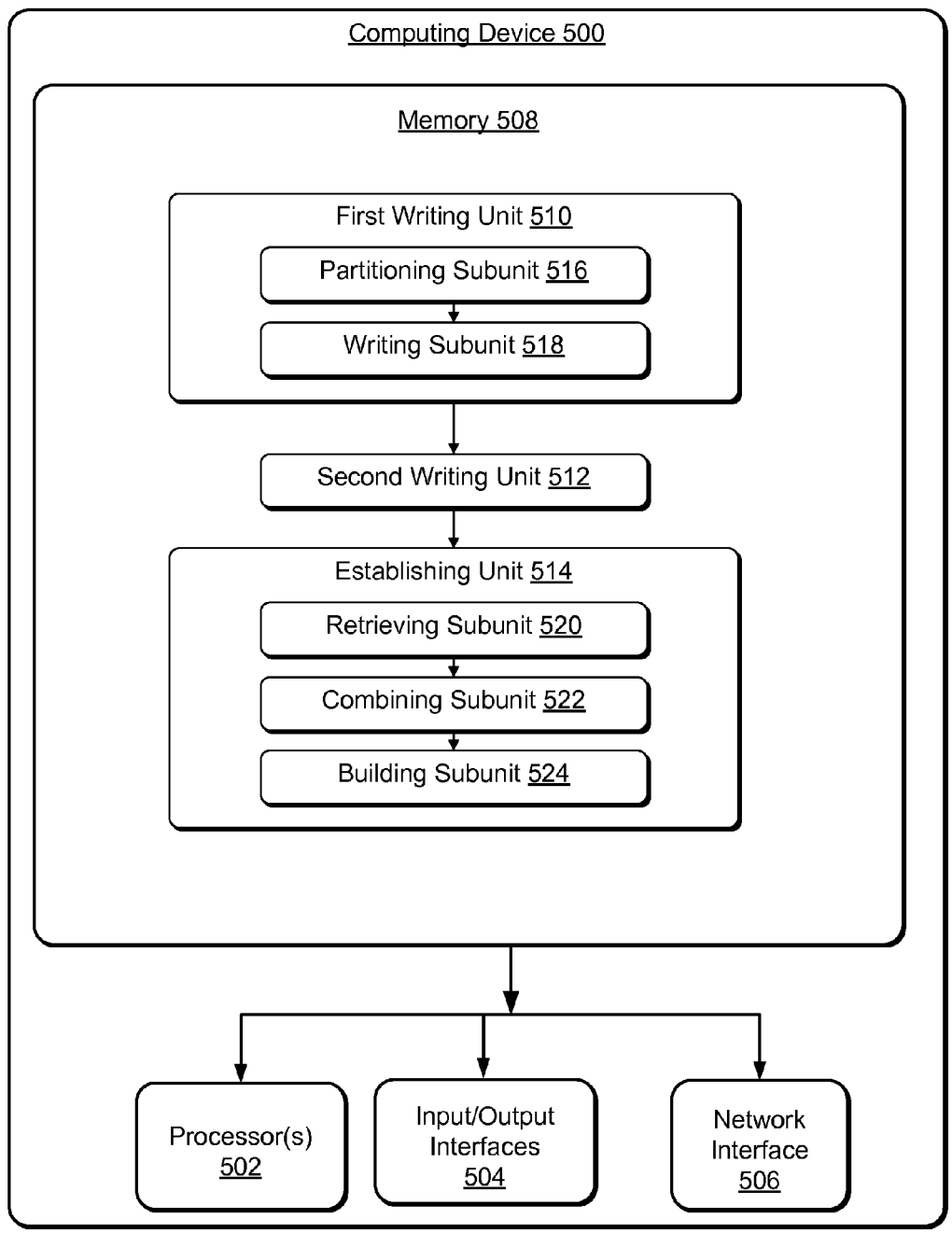
FIG. 5(a) is a block diagram of an apparatus for data processing using an inverted indexing system.
Figure 5B:
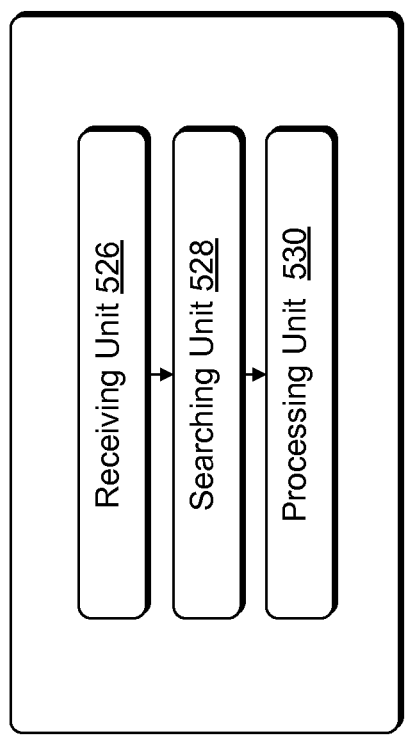
FIG. 5(b) is a block diagram of an apparatus for data processing using an inverted indexing system.

FIGS. 5(a) and 5(b) are schematic diagrams of illustrative computing architectures that enable system establishment and data processing. FIG. 5(a) is a diagram of a computing device 500. The computing device 500 may be a user device or a server for system establishment and data processing. In one exemplary configuration, the computing device 500 includes one or more processors 502, input/output interfaces 504, network interface 506, and memory 508.

The memory 508 may include computer-readable media in the form of volatile memory, such as random-access memory (RAM) and/or non-volatile memory, such as read only memory (ROM) or flash RAM. The memory 508 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 508 in more detail, the memory 508 may include a first writing unit 510, a second writing unit 512, and an establishing unit 514. The first writing unit 510 may be configured to write inverted indexing of a massive amount of data records into at least one inverted file. The second writing unit 512 may be configured to write description information of the written inverted file into a description file associated with the inverted file. The establishing unit 514 may be configured to establish an inverted indexing system based on the inverted file and the description file of the inverted file.

To establish the Lucene-based inverted indexing system, the first writing unit 510 may write inverted indexes of a massive amount of data records into at least one inverted file; after finishing the writing to the inverted file. The second writing unit 512 may write description information of the written inverted file into a description file associated with the inverted file. The establishing unit 514 may establish an inverted indexing system based on the inverted file and the description file of the inverted file.

In the system for establishing the Lucene-based inverted indexing system based on the embodiments, the inverted indexes of the massive amount of data are written to the inverted file, and the description information of the inverted file is written to the description file, and then the inverted indexing system is established based on the inverted file and the description file of the inverted file. As compared with the conventional art, the system for establishing the Lucene-based inverted indexing system may prevent a process of modification for the file header using an external storage device after the finish of writing the inverted indexing file. In these instances, embodiments of the present disclosure separate the inverted file and the description file of the inverted file as two or more independent files. These embodiments use the Lucene's feature of writing in sequence and enhance the efficiency in establishing the Lucene-based inverted indexing system without the necessity of using an external storage device for processing the Lucene's writing of a whole inverted file.

In some embodiments, the first writing unit may include a partitioning sub-unit 516 and a writing sub-unit 518. The partitioning sub-unit 516 may partition the massive amount of data records into multiple data segments, and the writing sub-unit 518 may write inverted indexes of data records of each data segment to at least one inverted file. In accordance with the structure of the first writing unit 510, the establishing unit may include a retrieving sub-unit 520, a combining sub-unit 522, and an establishing sub-unit 524. The retrieving sub-unit 520 may select one attribution of the data records as a function argument and for retrieving a function value based on a predetermined functional mapping relation. The combining sub-unit 522 may combine the inverted file and the description file of the inverted file belonging to the data records that have the same function value into one indexing segment partition. The establishing sub-unit 524 may establish the inverted indexing system based on the multiple indexing segment partitions.

The above system for establishing the Lucene-based inverted indexing system also may be used for data processing. FIG. 5(b) shows a system for processing data in the Lucene-based inverted indexing system. The system includes: a receiving unit 526, a searching unit 528, and a processing unit 530. The receiving unit 526 may be configured to receive a searching keyword and a data processing request from a user's input. The searching unit 528 may be configured to search the massive amount of data records based on the searching keyword using the Lucene-based inverted indexing system. The Lucene-based inverted indexing system is established by the above method. The processing unit 530 may be configured to perform a data processing corresponding to the data processing request in connection to a searching result based on a value in the inverted indexing system for the searching keyword.

In some embodiments, the receiving unit 526 may receive a searching keyword and a data processing request from a user's input. The searching unit 528 may search through the massive amount of data records based on the searching keyword using the Lucene-based inverted indexing system. The processing unit 530 may perform a data processing corresponding to the data processing request in connection with a searching result based on a value in the inverted indexing system for the searching keyword.

Embodiments of the present disclosure use an inverted indexing system to greatly enhance the efficiency of data processing. In addition, the system for processing data may have different implementations based on different types of data processing. For example, when the data processing request received by the receiving unit 526 is for retrieving statistics of the searching result, the processing unit 530 may include a sorting sub-unit and a statistics performing sub-unit. In these instances, the sorting sub-unit may sort the searching result based on the value in the inverted indexing system for the searching keyword, and the statistics performing sub-unit may perform a data statistics based on the sorted searching result. When the data processing request is for cross grouping of the searching result, the processing unit 530 may include a constraint condition forming sub-unit and a cross-grouping sub-unit. In these instances, the constraint condition forming sub-unit may perform a cross-combining operation based on the value in the inverted indexing system for the searching keyword to form a constraint condition of a new cross-grouping searching, and the cross-grouping sub-unit may perform a cross-grouping operation in connection with the searching result based on the constraint condition of searching. When the data processing request is for de-duplication and summation of the searching result, the processing unit 530 may include a record number looking up sub-unit and a data object summation sub-unit. In these instances, the record number looking up sub-unit may look up a record number corresponding to the value in the inverted indexing system for the searching keyword; and the data object summation sub-unit may obtain a data object based on the record number and perform a summing up operation in connection with the obtained data object.

For the convenience of explanation, the above systems are illustrated in a manner that each unit is illustrated as separate units with respect to their functions. However, the present disclosure may be implemented in a manner that the functions of all units are embodied in one or multiple software(s) and/or hardware(s).

In addition to the above description of embodiments, it is clear to persons of ordinary skill in the art that the present disclosure may be accomplished by means of software and its universal hardware platform. Based on this, the above technical solutions or the portion may be substantially embodied in form of a software product. The computer software product may be stored in a computer readable storage medium such as ROM/RAM, disk, CD-ROM, etc, and contains several instructions to instruct a computer equipment, for example, a personal computer, a server, or a network equipment, to perform method as described in the various embodiments.

The various embodiments of the present disclosure are described step by step. The same and similar portions among the various embodiments may be referred with each other where the explanation is for explaining a difference thereof. Especially, the description of the system of the present disclosure is relatively brief, since its basic structure is similar to that of the method of the present disclosure, and the related portion may be found in the embodiments of the method of the present disclosure. The embodiments of the system and the system of the present disclosure are merely schematically explained, wherein an element explained as a separate element may be either a physically separate element or a physically not separate element. An object shown as a unit may be a physical element, which may be either a location of place or be distributed to several locations in the network. All or portion of the modules may be applied for the implementation based on practical requirement and objects. People with ordinary skill in the art may comprehend and implement the present disclosure without any other extra creative effort.

The present disclosure may be applied in numerous general (or specific) computing system and configuration, such as a personal computer, a server computer, a handheld device, a portable device, a tablet device, a multi-processor system, a system based on microprocessor, a set-top box, a programmable consumer electronics device, a networking PC, a mini-computer, a larger computer, and a distributed computing environment including any above systems and devices.

The present disclosure may be described in a general context of computer executable instructions performed by a computer, such as program modules. Generally, the program module includes routines, programs, objects, components, data structures, etc. that performs particular tasks or implement particular abstract data types. The present disclosure may also be practiced in a distributed computing environment. In such distributed computing environment, the task is performed in a remote processing terminal which is connected via the communications networks. In a distributed computing environment, the program module may be located in a remote and local computer storage media including storage terminal equipment.

It should be noted that the above description is merely the embodiments of the present disclosure. Modification and variations may be made by persons with ordinary skill in the art without departing from the spirit of the present disclosure, and all such modifications and variations are intended to be included herein within the scope of the present disclosure.

What is claimed is:

1. A method for establishing an indexing system, the method comprising:
    writing, by a computing device including one or more processors, multiple inverted indexes of data records into at least one inverted file;
    writing, by the computing device, description information of the at least one inverted file to a description file corresponding to the at least one inverted file; and
    establishing, by the computing device, the inverted indexing system based on the at least one inverted file and the description file corresponding to the at least one inverted file,
    wherein the establishing the inverted indexing system based on the at least one inverted file and the description file corresponding to the at least one inverted file comprises:
        selecting an attribute of the data records as a function argument,
        retrieving a function value based on a predetermined functional mapping relation,
        combining the at least one inverted file and the description file corresponding to the at least one inverted file that corresponds to multiple data records that have the function value, into an indexing segment partition, and
        establishing the inverted indexing system based on the indexing segment partition.

2. The method of claim 1, wherein the writing the multiple inverted indexes of the data records into the at least one inverted file comprises:
    partitioning the data records into multiple data segments; and
    writing inverted indexes of an individual data segment of the multiple data segments into the at least one inverted file.

3. The method of claim 1, wherein the inverted indexing system is a Lucene-based inverted indexing system.

4. One or more non-transitory computer-readable media storing computer-executable instructions that, when executed by one or more processors, instruct the one or more processors to perform acts comprising:
    receiving a query including a searching keyword; and
    performing a search upon the searching keyword using an inverted indexing system that is established by:
        writing multiple inverted indexes of data records into at least one inverted file,
        writing description information of the at least one inverted file to a description file corresponding to the at least one inverted file; and
        establishing the inverted indexing system based on the at least one inverted file and the description file corresponding to the at least one inverted file,
    wherein the establishing the inverted indexing system based on the at least one inverted file and the description file corresponding to the at least one inverted file comprises:
        selecting an attribute of the data records as a function argument,
        retrieving a function value based on a predetermined functional mapping relation,
        combining the at least one inverted file and the description file corresponding to the at least one inverted file that corresponds to multiple data records that have the function value, into an indexing segment partition, and
        establishing the inverted indexing system based on the indexing segment partition.

5. The one or more computer-readable media of claim 4, wherein the writing the multiple inverted indexes of the data records into the at least one inverted file comprises:
    partitioning the data record into multiple data segments; and
    writing inverted indexes of an individual data segment of the multiple data segments into the at least one inverted file.

6. The one or more computer-readable media of claim 4, wherein the inverted indexing system is a Lucene-based inverted indexing system.

7. The one or more computer-readable media of claim 4, wherein the acts further comprise:
    receiving a data processing request; and
    performing a data processing corresponding to the data processing request in connection with a searching result based on a value in the inverted indexing system for the searching keyword.

8. The one or more computer-readable media of claim 7, wherein the acts further comprise:
    sorting the searching result based on the value in the inverted indexing system for the searching keyword; and
    providing data statistics based on the sorted searching result.

9. The one or more computer-readable media of claim 7, wherein the performing the data processing corresponding to the data processing request in connection with the searching result based on the value in the inverted indexing system for the searching keyword comprises:
    performing a cross-combining operation based on the value in the inverted indexing system for the searching keyword to form a constraint condition of cross-grouping searching; and
    performing a cross-grouping operation in connection with the searching result based on the constraint condition of searching.

10. The one or more computer-readable media of claim 7, wherein the performing the data processing corresponding to the data processing request in connection with the searching result based on the value in the inverted indexing system for the searching keyword comprises:
    looking up a record number that corresponds to the value in the inverted indexing system for the searching keyword;
    retrieving a data object based on the record number; and
    performing a summing up operation in connection with the retrieved data object.

11. A system comprising:
    one or more processors; and memory to maintain a plurality of components executable by the one or more processors, the plurality of components comprising:
- a first writing unit configured to write multiple inverted indexes of data records into at least one inverted file,
- a second writing unit configured to write description information of the at least one inverted file to a description file corresponding to the inverted file, and
- a building unit configured to establish an inverted indexing system based on the at least one inverted file and the description file corresponding to the at least one inverted file, wherein the building unit is configured to further:
  - select an attribute of the data records as a function argument,
  - retrieve a function value based on a predetermined functional mapping relation,
  - combine the at least one inverted file and the description file corresponding to the at least one inverted file that corresponds to multiple data records that have the function value, into an indexing segment partition, and
  - establish the inverted indexing system based on the indexing segment partition.

12. The system of claim 11, wherein the first writing unit is configured to further:
- partition the data record into multiple data segments; and
- write inverted indexes of an individual data segment of the multiple data segments into one or more inverted files.

13. The system of claim 11, further comprising:
- a receiving unit configured to further receive a data processing request and a query including a searching keyword;
- a searching unit configured to perform a search upon the searching keyword using the inverted indexing system; and
- a processing unit configured to perform data processing corresponding to the data processing request in connection with a searching result based on a value in the inverted indexing system for the searching keyword.

14. The system of claim 13, further comprising:
- a sorting sub-unit configured to sort the searching result based on the value in the inverted indexing system for the searching keyword; and
- a statistic performing sub-unit configured to provide a data statistics based on the sorted searching result.

15. The system of claim 13, wherein the performing the data processing corresponding to the data processing request in connection with the searching result based on the value in the inverted indexing system for the searching keyword comprises:
- performing a cross-combining operation based on the value in the inverted indexing system for the searching keyword to form a constraint condition of cross-grouping searching; and
- performing a cross-grouping operation in connection with the searching result based on the constraint condition of searching.

16. The system of claim 13, wherein the performing the data processing corresponding to the data processing request in connection with the searching result based on the value in the inverted indexing system for the searching keyword comprises:
- looking up a record number that corresponds to the value in the inverted indexing system for the searching keyword;
- retrieving a data object based on the record number; and
- performing summing up operation in connection with the retrieved data object.

17. The system of claim 13, wherein the inverted indexing system is a Lucene-based inverted indexing system.

* * * * *